April 7, 1925.

C. M. DAVISON

VALVE RESEATING TOOL

Filed Nov. 16, 1922

Inventor
Clarence M. Davison

By John W. Harley.
Attorney

April 7, 1925.  
C. M. DAVISON  
VALVE RESEATING TOOL  
Filed Nov. 16, 1922  
1,532,653  
2 Sheets-Sheet 2

Inventor  
Clarence M. Davison  
By John W. Harley  
Attorney

Patented Apr. 7, 1925.

1,532,653

UNITED STATES PATENT OFFICE.

CLARENCE M. DAVISON, OF BALTIMORE, MARYLAND, ASSIGNOR TO POOLE ENGINEERING AND MACHINE COMPANY, OF BALTIMORE, MARYLAND, A CORPORATION OF MARYLAND.

VALVE-RESEATING TOOL.

Application filed November 16, 1922. Serial No. 601,269.

*To all whom it may concern:*

Be it known that I, CLARENCE M. DAVISON, a citizen of the United States, residing at Baltimore, in the State of Maryland, have invented certain new and useful Improvements in Valve-Reseating Tools; and I do hereby declare the following to be a full, clear, and exact description of the invention, such as will enable others skilled in the art to which it appertains to make and use the same.

My invention relates to tools for reseating valves.

Among the objects of my invention are:—

To provide a tool for reseating valves which can be readily transported from place to place and readily adjusted in location for reseating a valve.

To provide a tool especially suitable for reseating a plurality of axially aligned valve seats comprising means for aligning the reseating cutter with each seat.

To provide a tool for reseating valves comprising a cutter arbor and a feed screw acting therewith to guide said arbor and move same axially in both directions.

To provide a tool for reseating frustro-conical valve seats that are coaxial with cylindrical valve ports, said tool comprising means for axially aligning the reseating cutters with said ports.

These and further objects of my invention will become apparent in the following specification, reference being had to the accompanying drawings, and the means by which they are effectuated will be definitely pointed out in the claims.

In the drawings:—

Figure 1:
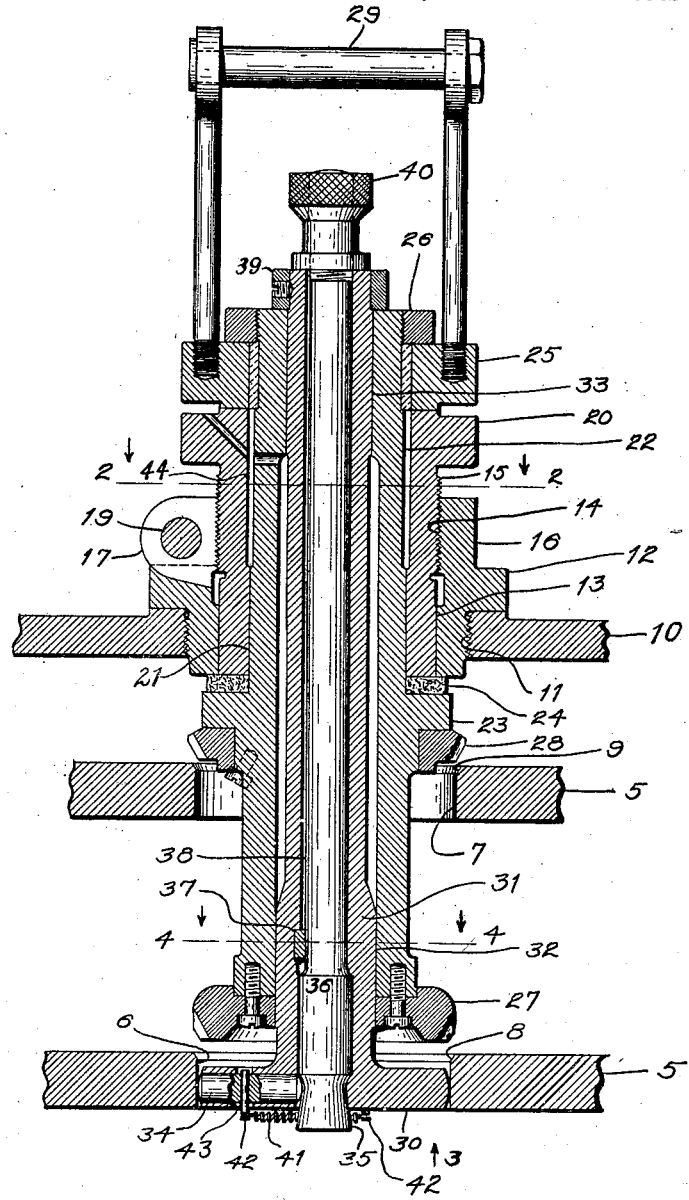
Figure 1 is a central axial section of my improved reseating tool.
Figure 4:
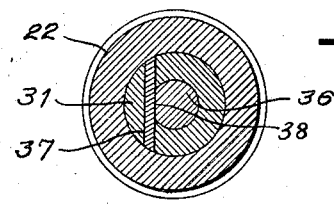
Fig. 4 is a partial section along the line 4—4 in Fig. 1 looking in the direction of the arrows.
Figure 2:
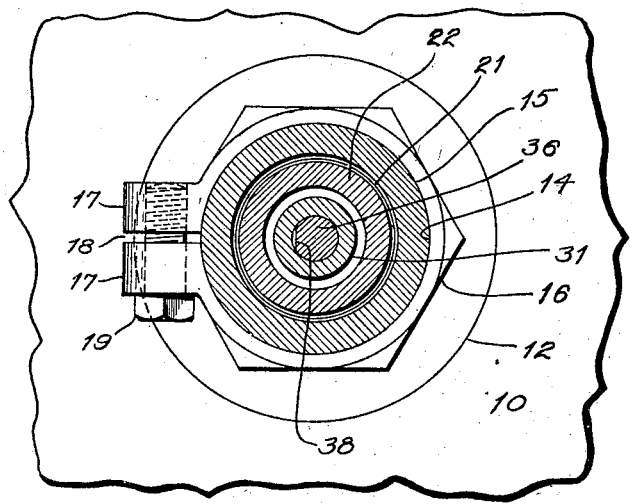
Fig. 2 is a section along the line 2—2 in Fig. 1 looking in the directions of the arrows.
Figure 3:
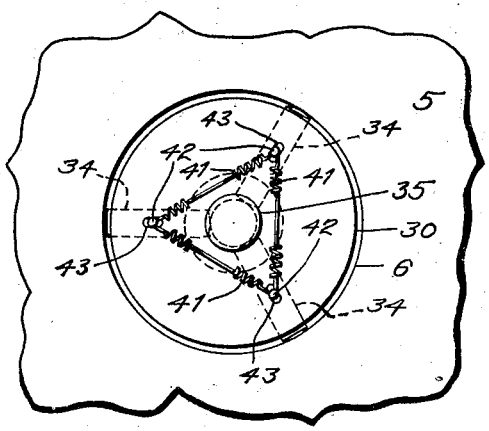
Fig. 3 is a view of the reseating tool looking in the direction of the arrow 3 in Fig. 1.

5—5 are walls forming part of a valve casing and comprising cylindrical ports 6 and 7 and frustro-conical valve seats 8 and 9.

10 is another wall forming part of the valve casing and comprising a threaded hole 11 in which the ordinary valve cap is usually threaded.

The cylindrical valve ports 6 and 7, the frustro-conical valve seats 8 and 9 and the threaded hole 11 are in axial alignment.

12 is an adapter threaded in the hole 11 and said adapter is provided with a bearing 13 and a threaded hole 14.

The portion of the adapter 12 which is threaded into the hole 11 is coaxial with the bearing 13 and threaded hole 14.

A feed screw 15 is threaded within the hole 14 and has a cylindrical portion which revolves within the bearing 13.

The adapter 12 is provided with a hexagonal portion 16 for the application of a wrench and with ears 17—17 between which a slot 18 is formed extending to the hole 14.

A bolt 19 serves to press the ears 17—17 together and thus clamp the feed screw 15. The feed screw 15 is provided with a flange 20 which may be made hexagonal in profile or of any other approved shape for the application of the hand or a wrench thereto.

The feed screw 15 is provided with a bearing 21 within which the arbor 22 is revolubly mounted. The arbor 22 is provided with a flange 23 against which rests a fiber or other composition washer 24, and another flange 25 is mounted upon said arbor in fixed angular relation thereto and retained in place by the nut 26.

The washer 24 and flange 25 form shoulder bearings for the arbor 22 against the ends of the feed screw 20; consequently, said arbor can be moved axially in both directions by said screw.

The axial movements of the screw 15 with reference to the adapter 12 are determined by the flange 20 and the washer 24, said washer being made sufficiently large to abut upon the lower end of said adapter.

Reseating cutters 27 and 28 are secured upon the arbor 22 and said cutters are revolved by the handle 29 which is secured to the flange 25. By means of the handle 29 my improved tool may be carried.

From the foregoing it will be evident that the bearing 21 provides for the axial alignment of the cutter 28 with the port 7.

It is also evident that if the seat 8 is to be in axial alignment with the port 7 and seat 9, some means must be provided for aligning the end of the arbor 22 with the port 6 and this alignment is effectuated by the following means:—

30 is a head of such diameter that it will easily pass within the port 6 and said head is provided with a sleeve 31 which is revolubly and slidably mounted in bearings 32 and 33 which are coaxial with the cutting edges of the teeth of the cutters 27 and 28. The head 30 is provided with radial holes in which are slidably mounted the three pins 34—34—34, said pins being of the same length. The pins 34 are pressed against the cylindrical surface of the port 6 by the frustro-conical end 35 formed upon the lower end of the adjusting rod 36 which is slidably mounted in an axial hole in the sleeve 31 and prevented from turning by the key 37 which contacts with the flat surface 38 formed upon the rod 36.

The sleeve 31 is prevented from moving below the position shown in Fig. 1 by the collar 39 and the nut 40 threaded upon the end of the rod 36 serves to draw the frustro-conical end 35 upwardly and thus move the pins 34 outwardly.

The springs 41 secured to the ends of the pins 42 which are mounted in the pins 34 and extend through holes 43 in the head 30, serve to move the pins 34 inwardly.

The operation of my improved tool for reseating valves is as follows:—

An adapter 12 having been placed thereon, which has a thread suitable for the threaded hole 11, the arbor and cutters are passed through said hole and said adapter is screwed into place.

Before the tool is placed in position as just described, the nut 40 is unscrewed and the rod 36 pressed downwardly so that the springs 41 may pull the pins 34 inwardly. After the tool is in place the nut 40 is then to be turned until it is felt that the pins 34 are in firm contact with the walls of the port 6, thus aligning the lower end of the arbor 22 with said port.

It is to be noted that the feed screw 15 is undercut as at 44 to reduce the length of the bearing 21 in order to permit of a very slight lateral motion of the end of the arbor 22.

The bolt 19 is then loosened sufficiently to permit a free movement of the feed screw 15. Said screw is moved inwardly until by turning the handle 29 it is felt that the cutters 27 and 28 are beginning to cut.

It is to be noted that my feed screw controls the axial position of the arbor 22 in both directions; consequently, the cutters will not follow any irregularities of the seats 8 and 9, but will cut off the high spots thereof and will bring said seats into perfect alignment with the ports 6 and 7.

I consider this to be a very valuable feature of my invention because it insures correct alignment of said seats.

While I have shown one form of my invention, it is to be understood that this is for purposes of illustration only and in nowise to limit the scope of my invention, for many changes may be made in the structure herein disclosed without departing from the spirit of my invention.

I claim:—

1. In a valve reseating tool for two axially aligned valve ports each having cylindrical portions and valve seats, the combination with an adapter, of a feed screw threaded in said adapter and comprising a bearing, an arbor moved axially by said screw and revolubly mounted in said bearing, two cutters on said arbor, the first cutter adjacent said screw and centered by said bearing with reference to the cylindrical portion of one port, the second cutter at the end of said arbor and means for centering said second cutter with reference to the cylindrical portion of the other port.

2. In a valve reseating tool for two axially aligned valve ports each having cylindrical portions and valve seats, the combination with an adapter and an arbor centered by said adapter with reference to the cylindrical portion of one port, means for centering said arbor with reference to the cylindrical portion of the other port, and cutters on said arbor for reseating said seats.

3. In a valve reseating tool for two axially aligned valve ports each having cylindrical portions and valve seats, the combination with an adapter, of a feed screw threaded in said adapter and comprising a bearing, an arbor moved axially by said screw and revolubly mounted in said bearing and comprising an axial hole, two cutters on said arbor, the first cutter adjacent said screw and centered by said bearing with reference to the cylindrical portion of one port, the second cutter at the end of said arbor, a head having a sleeve mounted in said hole and comprising pins for engaging the cylindrical portion of the other port, an adjusting rod mounted in said sleeve and comprising a frustro-conical portion for engaging one end of each of said pins, and means for moving said rod to press the other ends of said pins against the cylindrical portion of the other port to center therewith the second cutter.

4. In a valve reseating tool, the combination with an adapter having a slot therein and an arbor, of a feed screw threaded in said adapter and engaging shoulders on said arbor to move same axially, a bolt adjacent said slot for clamping said screw and a cutter on said arbor.

In testimony whereof, I affix my signature.

CLARENCE M. DAVISON.